(12) United States Patent
Ishihara et al.

(10) Patent No.: US 12,540,660 B2
(45) Date of Patent: Feb. 3, 2026

(54) DRIVE MODULE ASSEMBLY

(71) Applicant: BorgWarner Inc., Auburn Hills, MI (US)

(72) Inventors: Mitsuru Ishihara, Rochester Hills, MI (US); Calahan B. Campton, Fremont, CA (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/818,844

(22) Filed: Aug. 29, 2024

(65) Prior Publication Data
US 2025/0075780 A1    Mar. 6, 2025

Related U.S. Application Data

(60) Provisional application No. 63/535,553, filed on Aug. 30, 2023.

(51) Int. Cl.
B60K 1/00    (2006.01)
B60K 17/04   (2006.01)
(Continued)

(52) U.S. Cl.
CPC ........... F16H 37/0813 (2013.01); B60K 1/00 (2013.01); B60K 17/043 (2013.01);
(Continued)

(58) Field of Classification Search
CPC . B60K 2001/001; B60K 1/00; F16H 37/0813; F16H 48/00–2048/426
(Continued)

(56) References Cited

U.S. PATENT DOCUMENTS 5,997,425 A * 12/1999 Coutant ................. B62D 11/18
                                                   475/23
6,328,477 B1 * 12/2001 Tsujimoto ............. F16H 57/037
                                                   384/450
(Continued)

FOREIGN PATENT DOCUMENTS

CN        115195460 A      10/2022
DE    102005022926 B3 *    2/2007  ............ B60K 17/16
(Continued)

OTHER PUBLICATIONS

International Search Report for Application No. PCT/US2024/044395 dated Nov. 11, 2024, 2 pages.
(Continued)

*Primary Examiner* — Sherry L Estremsky
(74) *Attorney, Agent, or Firm* — Howard & Howard Attorneys PLLC

(57) ABSTRACT

A drive module assembly for use in a vehicle includes a housing defining a housing interior, and an electric machine including a rotor and a stator. The drive module assembly also includes a differential rotatably coupled to the rotor, a first input shaft rotatably coupled to the differential, a second input shaft rotatably coupled to the differential, a first counter shaft rotatably coupled to the first input shaft, a second counter shaft rotatably coupled to the second input shaft, a first output shaft rotatably coupled to the first counter shaft, and a second output shaft rotatably coupled to the second counter shaft. The differential is configured to receive rotational torque from the electric machine and configured to transmit rotational torque from the electric machine to the first and second input shafts.

20 Claims, 3 Drawing Sheets

(51) Int. Cl.
*F16H 37/08* (2006.01)
*F16H 57/021* (2012.01)
*B60K 6/36* (2007.10)
*B60K 17/354* (2006.01)
*B60K 17/356* (2006.01)
*F16H 57/02* (2012.01)

(52) U.S. Cl.
CPC ...... *F16H 57/021* (2013.01); *B60K 2001/001* (2013.01); *B60K 6/36* (2013.01); *B60K 17/354* (2013.01); *B60K 17/356* (2013.01); *B60Y 2200/92* (2013.01); *F16H 2057/02034* (2013.01); *F16H 2057/02052* (2013.01)

(58) Field of Classification Search
USPC .................................................. 475/225
See application file for complete search history.

(56) References Cited

U.S. PATENT DOCUMENTS

| | | | |
|---|---|---|---|
| 6,575,056 | B1 | 6/2003 | Gnandt |
| 6,770,005 | B2 | 8/2004 | Aikawa et al. |
| 8,499,868 | B2 | 8/2013 | Fuechtner et al. |
| 8,579,751 | B2 | 11/2013 | Phillips |
| 8,650,979 | B2 | 2/2014 | Ren et al. |
| 9,132,723 | B2 * | 9/2015 | Munster ............... B60K 17/046 |
| 9,255,633 | B2 * | 2/2016 | Märkl ................. B60K 17/165 |
| 10,036,458 | B2 * | 7/2018 | Littlefield ................ B60K 6/52 |
| 10,173,517 | B2 | 1/2019 | Janson |
| 10,320,277 | B2 * | 6/2019 | Gassmann ............. H02K 49/00 |
| 10,797,562 | B2 | 10/2020 | Dlala et al. |
| 10,920,858 | B2 | 2/2021 | Haupt et al. |
| 11,005,337 | B2 | 5/2021 | Hung et al. |
| 11,015,689 | B2 | 5/2021 | Klurfeld et al. |
| 11,025,113 | B2 | 6/2021 | Dlala |
| 11,054,001 | B1 | 7/2021 | Tamai et al. |
| 11,149,823 | B2 * | 10/2021 | Engerman ............... F16H 48/12 |
| 11,254,205 | B2 | 2/2022 | Cook et al. |
| 11,273,701 | B2 | 3/2022 | Devreese et al. |
| 11,293,534 | B2 | 4/2022 | Downs et al. |
| 11,306,803 | B2 | 4/2022 | Yang et al. |
| 11,320,047 | B2 | 5/2022 | Miebach et al. |
| 11,331,996 | B2 | 5/2022 | Bayer et al. |
| 11,391,348 | B2 | 7/2022 | Xie et al. |
| 11,394,270 | B2 | 7/2022 | Hung et al. |
| 11,421,774 | B2 | 8/2022 | Tamura et al. |
| 11,448,305 | B2 | 9/2022 | Engerman |
| 11,623,510 | B2 | 4/2023 | Engerman |
| 11,761,521 | B2 | 9/2023 | Wechs et al. |
| 11,773,957 | B2 | 10/2023 | Paoff et al. |
| 11,784,531 | B2 | 10/2023 | Makino et al. |
| 11,784,532 | B2 | 10/2023 | Makino et al. |
| 11,794,572 | B2 | 10/2023 | Engerman |
| 11,845,328 | B2 | 12/2023 | Downs et al. |
| 11,852,224 | B2 | 12/2023 | Brehmer et al. |
| 11,873,885 | B2 | 1/2024 | Labelle |
| 11,873,897 | B2 | 1/2024 | Nakamatsu et al. |
| 11,906,034 | B2 | 2/2024 | Nakamatsu et al. |
| 11,913,527 | B2 | 2/2024 | Kölbl |
| 11,946,532 | B2 | 4/2024 | Freiholtz et al. |
| 2005/0252707 | A1 | 11/2005 | Bowen |
| 2010/0154573 | A1 | 6/2010 | Jackson et al. |
| 2012/0129644 | A1 | 5/2012 | Palfai et al. |
| 2013/0002072 | A1 * | 1/2013 | Phillips ................. B60K 17/04 310/83 |
| 2013/0123058 | A1 | 5/2013 | Markl |
| 2014/0128194 | A1 | 5/2014 | Mair et al. |
| 2017/0136867 | A1 | 5/2017 | Holmes et al. |
| 2018/0112755 | A1 | 4/2018 | Littlefield et al. |
| 2019/0072168 | A1 | 3/2019 | Yamamura |
| 2020/0158218 | A1 | 5/2020 | Himmelbauer et al. |
| 2021/0339614 | A1 | 11/2021 | Walter |
| 2021/0347257 | A1 | 11/2021 | Zalewski et al. |
| 2022/0045574 | A1 * | 2/2022 | Iwata ..................... H02K 7/003 |
| 2022/0136569 | A1 | 5/2022 | Maurel |
| 2022/0178404 | A1 | 6/2022 | Zink et al. |
| 2022/0250714 | A1 | 8/2022 | Kuramoto et al. |
| 2023/0008955 | A1 | 1/2023 | Verbridge et al. |
| 2023/0022088 | A1 | 1/2023 | Reisch et al. |
| 2023/0022395 | A1 | 1/2023 | Holzlöhner et al. |
| 2023/0088074 | A1 | 3/2023 | Takahashi et al. |
| 2023/0135813 | A1 | 5/2023 | Reisch et al. |
| 2023/0167898 | A1 | 6/2023 | Li et al. |
| 2023/0219410 | A1 | 7/2023 | Lemaire et al. |
| 2023/0219411 | A1 | 7/2023 | Vassieux et al. |
| 2023/0271499 | A1 | 8/2023 | Markow |
| 2023/0286376 | A1 | 9/2023 | Kölbl |
| 2023/0322071 | A1 | 10/2023 | Voit et al. |
| 2023/0341034 | A1 | 10/2023 | Engerman et al. |
| 2023/0382222 | A1 | 11/2023 | Rapp et al. |
| 2023/0406095 | A1 | 12/2023 | Rossia et al. |
| 2024/0001749 | A1 | 1/2024 | Valente et al. |
| 2024/0060558 | A1 | 2/2024 | Wang et al. |
| 2025/0010702 | A1 * | 1/2025 | Yang .................. B60K 7/0007 |

FOREIGN PATENT DOCUMENTS

| | | | | |
|---|---|---|---|---|
| DE | 102011086743 | A1 | 5/2013 | |
| GB | 2604910 | A * | 9/2022 | ............ F16H 48/16 |
| JP | 59160621 | A * | 9/1984 | |
| WO | 2022246054 | A1 | 11/2022 | |
| WO | WO-2023186744 | A1 * | 10/2023 | ............... B60K 1/00 |
| WO | 2024006418 | A1 | 1/2024 | |

OTHER PUBLICATIONS

International Search Report for Application No. PCT/US2024/044314 dated Nov. 13, 2024, 2 pages.
English language abstract and machine-assisted English translation for CN 115 195 460 A extracted from espacenet.com database on Nov. 26, 2024, 13 pages.
English language abstract and machine-assisted English translation for DE 10 2011 086 743 A1 extracted from espacenet.com database on Nov. 26, 2024, 16 pages.
Nanjundaswamy, Harsha et al., "Next Generation 80 V SiC High-Speed eDrive Technology for Electrified Propulsion", 32nd A1chen Colloquium Sustainable Mobility, 2023, 21 pages.
U.S. Appl. No. 18/819,511, filed Aug. 29, 2024.

* cited by examiner

DRIVE MODULE ASSEMBLY

CROSS-REFERENCE TO RELATED APPLICATIONS

This application claims priority to and all the benefits of U.S. Provisional Application No. 63/535,553, filed Aug. 30, 2023, which is hereby incorporated by reference in its entirety.

BACKGROUND OF THE INVENTION

1. Field of the Disclosure

The subject disclosure generally relates to a drive module assembly and, in particular, a drive module assembly for use in a vehicle.

2. Description of the Related Art

Conventional drive module assemblies include an electric machine configured to deliver rotational torque to wheels of a vehicle. To help deliver rotational torque to wheels of a vehicle, conventional drive module assemblies include gears and a differential to ultimately deliver the rotational torque from the electric machine to wheels of the vehicle to allow the vehicle to maneuver.

As hybrid vehicles and battery electric vehicles become more prevalent, the need for efficient and reliable drive module assemblies has become increasingly important. One of the main challenges in designing drive module assemblies for hybrid vehicles and battery electric vehicles is achieving high efficiency while maintaining a compact size and low weight. Hybrid vehicles and battery electric vehicles often have limited space available for the drive module assembly, and any added weight can reduce the vehicle's range and performance.

In recent years, advances in electric motor technology and power electronics have led to the development of more compact and efficient drive module assemblies. However, in recent years, there still has been a limitation on input speed of drive module assemblies including planetary gear systems due to capabilities of bearings used in the drive module assemblies. Furthermore, in drive module assemblies including a layshaft, there has been a limitation on achievable gear ratios due to the size of various components, such as diameter of the input shaft. Additionally, as reducing the overall size of drive module assemblies has been desired, various components of the drive module assemblies necessarily are required to be smaller. However, reducing the size of various components limits performance of the drive module assembly, such as lowering the torque capacity of the drive module assembly. Therefore, there still remains a need for a drive module assembly being lighter and more compact, all while having improved efficiency and increased performance while addressing the deficiencies set forth above.

SUMMARY OF THE INVENTION

A drive module assembly for use in a vehicle includes a housing defining a housing interior and an electric machine. The electric machine includes a rotor disposed in the housing interior and extending along a rotor axis, and a stator disposed about the rotor with respect to the rotor axis such that the stator surrounds the rotor. The drive module assembly additionally includes a differential rotatably coupled to the rotor, a first input shaft rotatably coupled to the differential, and a second input shaft rotatably coupled to the differential. The drive module assembly further includes a first counter shaft rotatably coupled to the first input shaft, a second counter shaft rotatably coupled to the second input shaft, a first output shaft rotatably coupled to the first counter shaft, and a second output shaft rotatably coupled to the second counter shaft. The differential is configured to receive rotational torque from the electric machine and configured to transmit rotational torque from the electric machine to the first and second input shafts.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION

Figure 1:
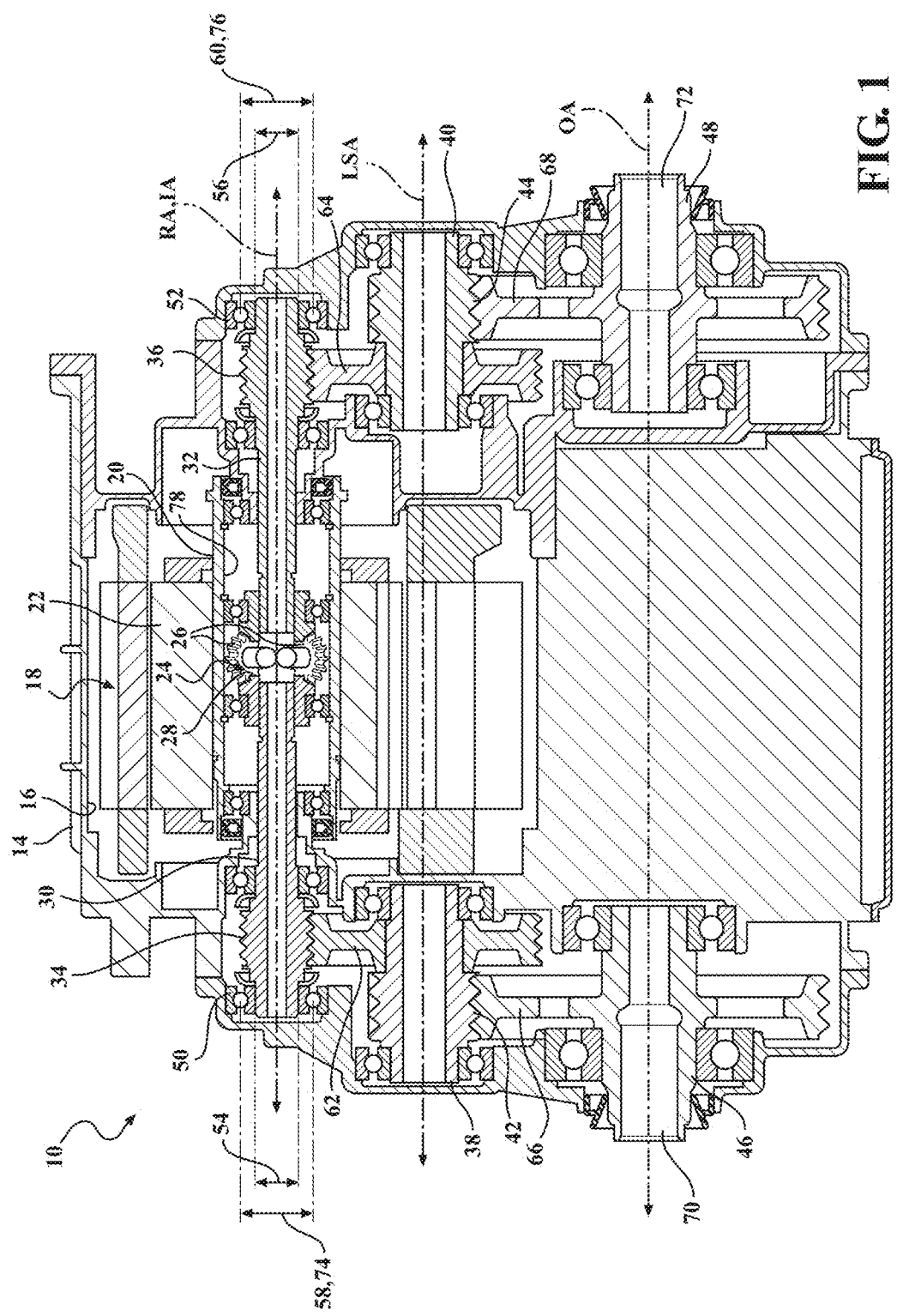
FIG. 1 is a cross-sectional view of a drive module assembly including a housing, an electric machine including a rotor and a stator, a differential, a first input shaft, a second input shaft, a first counter shaft, a second counter shaft, a first output shaft, and a second output shaft.

With reference to the Figures, wherein like numerals indicate like parts throughout the several views, a drive module assembly 10 for use in a vehicle, is shown in a cross-sectional view in FIG. 1. The vehicle may include an internal combustion engine and, therefore, be a hybrid vehicle. The vehicle may also be a battery electric vehicle that is free of an internal combustion engine. It is to be appreciated that the vehicle may include one or more of the drive module assembly 10 described below, such as two drive module assemblies.

The drive module assembly 10 includes a housing 14, which may be one or more components, defining a housing interior 16 and an electric machine 18. The electric machine 18 includes a rotor 20 disposed in the housing interior 16 and extending along a rotor axis RA, and a stator 22 disposed about the rotor 20 with respect to the rotor axis RA such that the stator 22 surrounds the rotor 20. The stator 22 may be commonly referred to as a lamination stack.

The drive module assembly 10 additionally includes a differential 24 rotatably coupled to the rotor 20, a first input shaft 30 rotatably coupled to the differential 24, and a second input shaft 32 rotatably coupled to the differential 24. The differential 24 may be directly rotatably coupled to the rotor 20 or may have an intermediate component or components between the rotor 20 and the differential 24. When the differential 24 is directly coupled to the rotor 20, the differential 24 may be directly coupled with the lamination steel of the rotor 20. Similarly, the differential 24 may be directly coupled to the first input shaft 30 and the second input shaft 32 or may have an intermediate component or components between the differential 24 and the first and second input shafts 30, 32. The differential 24 may include a differential pinion gear 26 and a differential side gear 28.

The rotor 20 may define a rotor interior 78 with the differential 24 disposed in the rotor interior 78. In such embodiments, the rotor 20 may be commonly referred to as a hollow rotor shaft. The first and second input shafts 30, 32 may be disposed in the rotor interior 78 when the rotor 20 is a hollow rotor shaft.

The drive module assembly 10 further includes a first counter shaft 38 rotatably coupled to the first input shaft 30, a second counter shaft 40 rotatably coupled to the second input shaft 32, a first output shaft 46 rotatably coupled to the first counter shaft 38, and a second output shaft 48 rotatably coupled to the second counter shaft 40. The first output shaft 46 may include a first output spline 70 and the second output shaft 48 may include a second output spline 72.

The differential 24 is configured to receive rotational torque from the electric machine 18 and configured to transmit rotational torque from the electric machine 18 to the first and second input shafts 30, 32. The first counter shaft 38 may have a first counter drive gear 42 that is rotatably coupled to the first counter shaft 38 and a second counter drive gear 44 that is rotatably coupled to the second counter shaft 40. The first counter drive gear 42 may be integral with the first counter shaft 38 and the second counter drive gear 44 may be integral with the second counter shaft 40.

Having the differential 24 configured to receive rotational torque from the electric machine 18 and configured to transmit rotational torque from the electric machine 18 to the first and second input shafts 30, 32 offers several advantages. First, the differential 24 is able to split the rotational torque received from the rotor 20 and is able to divide the rotational torque between the first input shaft 30 and the second input shaft 32. In other words, the first input shaft 30 may receive one half of the rotational torque from the electric machine 18 and the second input shaft 32 may receive the other half of the rational torque from the electric machine 18. Because the first input shaft 30 receives half of the rotational torque from the electric machine 18 and the second input shaft 32 receives the other half of the rotational torque from the electric machine 18, the size (diameter) of the first and second input shafts 30, 32 may be reduced, as described in further detail below. Second, having the differential 24 configured to receive rotational torque from the electric machine 18 and configured to transmit rotational torque from the electric machine 18 to the first and second input shafts 30, 32 allows for a compact design of the drive module assembly 10 all while enabling higher gear ratios, as described in further detail below.

The drive module assembly 10 may include a first counter driven gear 62 rotatably coupled to the first input shaft 30 and the first counter shaft 38 and configured to deliver rotational torque from the first input shaft 30 to the first counter shaft 38, and a second counter driven gear 64 rotatably coupled to the second input shaft 32 and the second counter shaft 40 and configured to deliver rotational torque from the second input shaft 32 to the second counter shaft 40.

The drive module assembly 10 may further include a first output gear 66 rotatably coupled to the first counter shaft 38 and the first output shaft 46 and configured to deliver rotational torque from the first counter shaft 38 to the first output shaft 46, and a second output gear 68 rotatably coupled to the second counter shaft 40 and the second output shaft 48 and configured to deliver rotational torque from the second counter shaft 40 to the second output shaft 48.

The drive module assembly 10 may include a first bearing 50 coupled to the first input shaft 30 and configured to support rotation of the first input shaft 30, and a second bearing 52 coupled to the second input shaft 32 and configured to support rotation of the second input shaft 32. The first input shaft 30 has a first input diameter 54, the second input shaft has a second input diameter 56, the first bearing 50 has a first bearing diameter 58, and the second bearing 52 has a second bearing diameter 60. Having the differential 24 configured to receive rotational torque from the electric machine 18 and configured to transmit rotational torque from the electric machine 18 to the first and second input shafts 30, 32 allows the first and second input diameters 54, 56 and the first and second bearing diameters 58, 60 to be reduced in size. For example, the first input diameter 54 may be less than 32 millimeters, and the second input diameter 56 may be less than 32 millimeters. In another embodiment, the first input diameter 54 may be less than 29 millimeters, and the second input diameter 56 may be less than 29 millimeters. In another embodiment, the first input diameter 54 may be less than 26 millimeters, and the second input diameter 56 may be less than 26 millimeters. In another embodiment, the first input diameter 54 may be less than 23 millimeters, and the second input diameter 56 may be less than 23 millimeters. In another embodiment, the first input diameter 54 may be less than 20 millimeters, and the second input diameter 56 may be less than 20 millimeters. In another embodiment, the first input diameter 54 may be less than 32 millimeters, and the second input diameter 56 may be less than 32 millimeters. As an additional example, the first bearing diameter 58 may be less than 43 millimeters, and the second bearing diameter 60 may be less than 43 millimeters. In another embodiment, the first bearing diameter 58 may be less than 41 millimeters, and the second bearing diameter 60 may be less than 41 millimeters. In another embodiment, the first bearing diameter 58 may be less than 39 millimeters, and the second bearing diameter 60 may be less than 39 millimeters. In another embodiment, the first bearing diameter 58 may be less than 37 millimeters, and the second bearing diameter 60 may be less than 37 millimeters. In one embodiment, the first input diameter 54 and the second input diameter 56 are 19 millimeters and the first bearing diameter 58 and the second bearing diameter 60 are 35 millimeters.

Typically, the first and second bearing diameters 58, 60 is dependent on the first and second input diameters 54, 56, respectively. In other words, depending on the first and second input diameters 54, 56, the first and second bearing diameters 58, 60 are adjusted. Having the differential 24 configured to receive rotational torque from the electric machine 18 and configured to transmit rotational torque from the electric machine 18 to the first and second input shafts 30, 32 allows the first and second input diameters 54, 56 to be reduced and, in turn, the first and second bearing diameters 58, 60 to be reduced, which ultimately allows for a higher gear ratio due to the reduced space occupied by the first and second input shafts 30, 32 and the first and second bearings 50, 52 in the drive module assembly 10. A reduced diameter in the first and second bearing diameters 58, 60 reduces the rotating pitch diameter speed of the first and second bearings 50, 52, which allows for greater selection in bearings to use in the drive module assembly 10.

Figure 2:
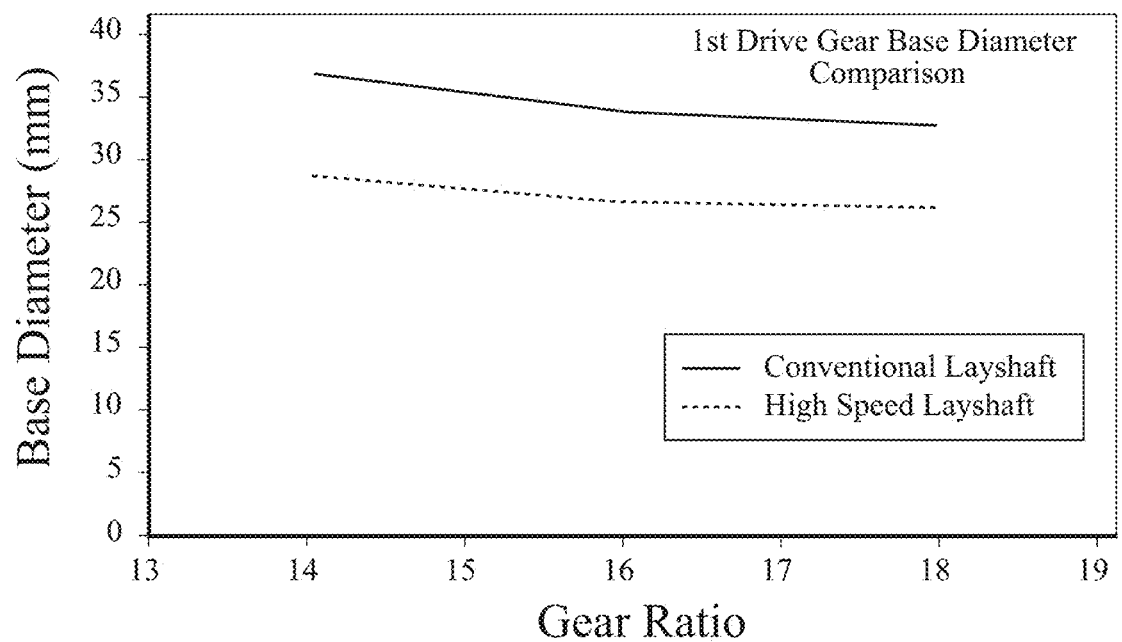
FIG. 2 is a graph illustrating a gear ratio versus a $1^{st}$ drive gear base diameter.
Figure 3:
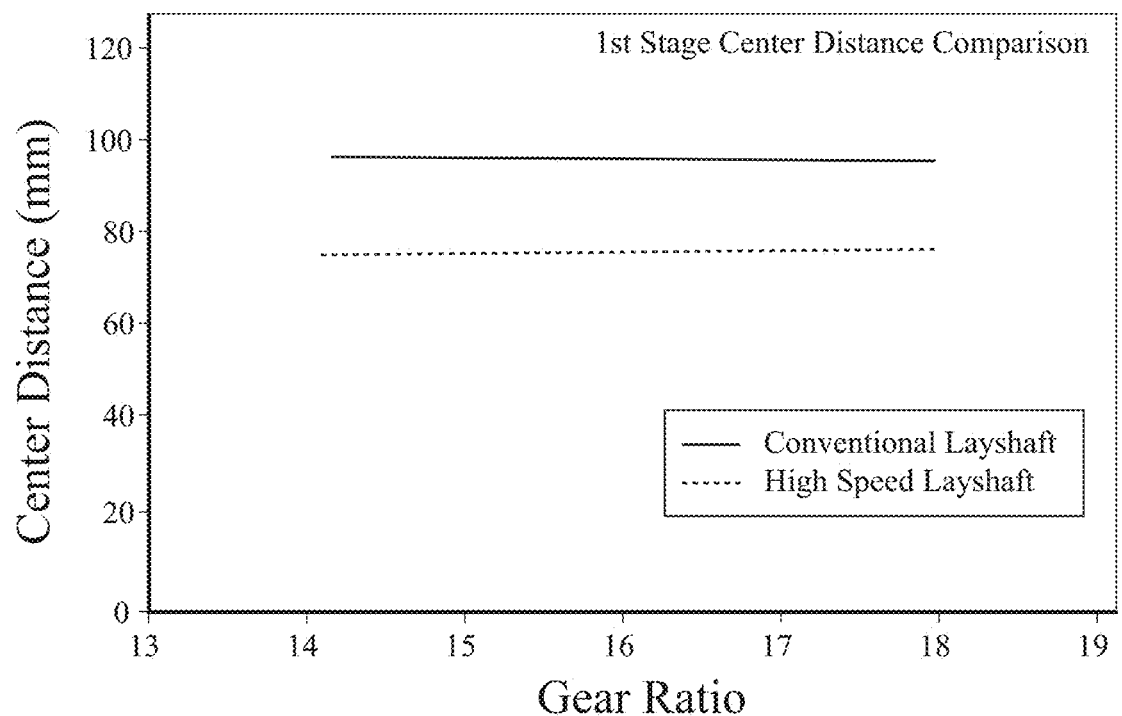
FIG. 3 is a graph illustrating a gear ratio versus a center distance between an input axis of the first and second input shafts and a counter shaft axis of the first and second counter shafts.

The first input shaft 30 may have a first input drive gear 34 that is rotatably coupled to the first input shaft 30 and a second input drive gear 36 that is rotatably coupled to the second input shaft 32. The first input drive gear 34 may be integral with the first input shaft 30 and the second input drive gear 36 may be integral with the second input shaft 32. The first input drive gear 34 may have a first drive gear diameter 74 and the second input drive gear 36 may have a second drive gear diameter 76. As described above, having the first input diameter 54 of the first input shaft 30 being decreased in size and the second input diameter 56 of the second input shaft 32 being decreased in size allows for decreased first and second bearing diameters 58, 60, but also allows for decreased first and second drive gear diameters 74, 76. Having the decreased first and second drive gear diameters 74, 76 allows for a higher gear ratio of the first and/or second input drive gears 34, 36, which is illustrated in FIG. 2. The base diameter in FIG. 2 refers to the first and/or second drive gear diameters 74, 76. Similarly, FIG. 3 illustrates a gear ratio of the first and/or second input drive gears 34, 36 versus a center distance. The center distance in the graph of FIG. 3 represents the distance between the input axis IA and the counter shaft axis CSA. To this end, the first and second input diameters 54, 56 impact the first and second drive gear diameters 74, 76 because the first and second drive gear diameters 74, 76 cannot be less than the first and second input diameters 54, 56, and, therefore, due to reduced diameter of the first and second input diameters 54, 56, the first and second drive gear diameters 74, 76 may be reduced, which allows for a higher gear ratio. A higher gear ratio allows for higher torque applications of the drive module assembly 10. For example, the drive module assembly 10 may have a peak torque of about 250 Nm, 300 Nm, 350 Nm, 400 Nm, 450 Nm, 500 Nm, 550 Nm, 600 Nm, 650 Nm, or more, a peak speed (such as the first and second input shafts 30, 32) of greater than 20,000 RPM, greater than 21,000 RPM, greater than 22,000 RPM, and greater than 23,000 RPM or more, and a gear ratio of 9, 10, 11, 12, 13, 14, 15, 16, 17, 18, 19 or greater.

The first and second input shafts 30, 32 may extend along an input axis IA, the first and second counter shafts 38, 40 may extend along a counter shaft axis CSA, and the first and second output shafts 46, 48 extend along an output axis OA. In one embodiment, the input axis IA, the counter shaft axis CSA, and the output axis OA are parallel to one another. The input axis IA, the counter shaft axis CSA, and the output axis OA may be offset from one another. In one embodiment, the counter shaft axis CSA is disposed between the input axis IA and the output axis OA.

Figure 4:
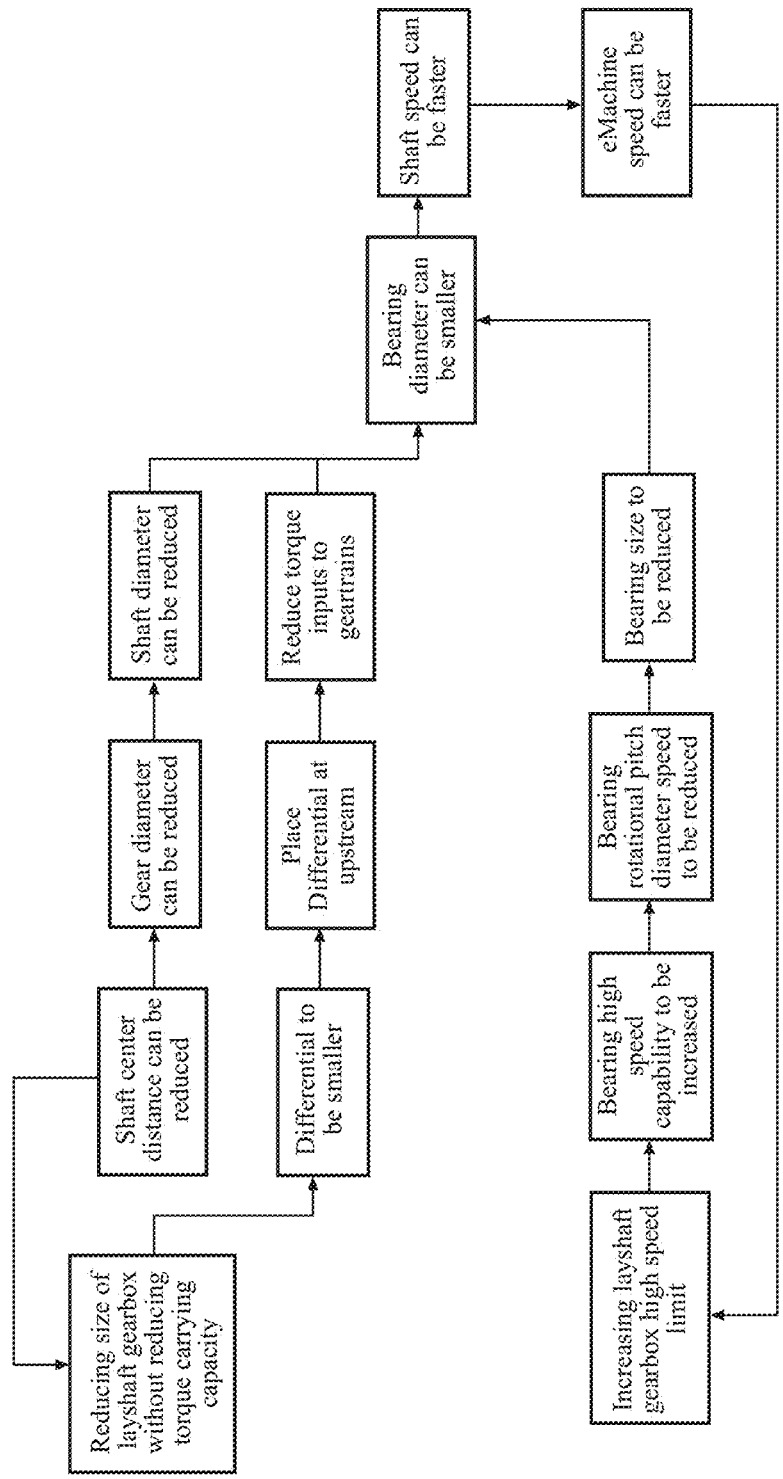
FIG. 4 is an exemplary flow diagram of reducing the size of the drive module assembly.

In addition to the advantages set forth above, having the differential 24 configured to receive rotational torque from the electric machine 18 and configured to transmit rotational torque from the electric machine 18 to the first and second input shafts 30, 32 allows the differential 24 to be smaller. This reduces the torque input to the geartrains, such as the first and second input drive gears 34, 36, the first and second counter driven gears 62, 64, and the first and second output gears 66, 68. Having a reduction in size of the differential 24 based on being configured to transmit rotational torque from the electric machine 18 to the first and second input shafts 30, 32 provides the opportunity, if desired, to reduce the first input diameter 54 of the first input shaft 30 and/or the second input diameter 56 of the second input shaft 32. Additionally, when the first input diameter 54 of the first input shaft 30 and the second input diameter 56 of the second input shaft 32 is reduced, a diameter of the first and second input drive gears 34, 36 may also be reduced. Due to a reduction in the diameter of the first and second input drive gears 34, 36, a distance defined between the input axis IA and the counter shaft axis CSA may also be reduced. Furthermore, when the first input diameter 54 of the first input shaft 30 and the second input diameter 56 of the second input shaft 32 is reduced, the first and second bearing diameters 58, 60 of the first and second bearings 50, 52 may also be reduced. Reducing the first and second bearing diameters 58, 60 then allows the first and second input shafts 30, 32 to rotate faster, which, in turn, allows the electric machine 18 to rotate the rotor 20 faster. This is summarized in FIG. 4.

What is claimed is:

1. A drive module assembly for use in a vehicle, said drive module assembly comprising:
    a housing defining a housing interior;
    an electric machine, comprising,
        a rotor disposed in said housing interior and extending along a rotor axis, and wherein said rotor defines a rotor interior, and
        a stator disposed about said rotor with respect to said rotor axis such that said stator surrounds said rotor;
    a differential rotatably coupled to said rotor and disposed in said rotor interior;
    a first input shaft rotatably coupled to said differential;
    a second input shaft rotatably coupled to said differential;
    a first counter shaft rotatably coupled to said first input shaft;
    a second counter shaft rotatably coupled to said second input shaft;
    a first output shaft rotatably coupled to said first counter shaft; and
    a second output shaft rotatably coupled to said second counter shaft;
    wherein said differential is configured to receive rotational torque from said electric machine and configured to transmit rotational torque from said electric machine to said first and second input shafts; and
    wherein said drive module assembly further comprises a first differential bearing that is disposed in said rotor interior and is coupled to said differential and said rotor to support rotation of said first input shaft, and a second differential bearing that is disposed in said rotor interior and is coupled to said differential and said rotor to support rotation of said second input shaft.

2. The drive module assembly as set forth in claim 1, wherein said differential is directly coupled to said rotor.

3. The drive module assembly as set forth in claim 1, wherein said differential is directly coupled to said first and second input shafts.

4. The drive module assembly as set forth in claim 1, further comprising a first bearing coupled to said first input shaft and configured to support rotation of said first input shaft, and a second bearing coupled to said second input shaft and configured to support rotation of said second input shaft.

5. The drive module assembly as set forth in claim 1, wherein said first input shaft has a first input diameter that is less than 32 millimeters, and wherein said second input shaft has a second input diameter that is less than 32 millimeters.

6. The drive module assembly as set forth in claim 5, wherein said first input diameter is less than 29 millimeters, and wherein said second input shaft has a second input diameter that is less than 29 millimeters.

7. The drive module assembly as set forth in claim 4, wherein said first bearing has a first bearing diameter that is less than 43 millimeters, and wherein said second bearing has a second bearing diameter that is less than 43 millimeters.

8. The drive module assembly as set forth in claim 1, further comprising a first counter driven gear rotatably coupled to said first input shaft and said first counter shaft and configured to deliver rotational torque from said first input shaft to said first counter shaft, and a second counter driven gear rotatably coupled to said second input shaft and said second counter shaft and configured to deliver rotational torque from said second input shaft to said second counter shaft.

9. The drive module assembly as set forth in claim 1, further comprising a first output gear rotatably coupled to said first counter shaft and said first output shaft and configured to deliver rotational torque from said first counter shaft to said first output shaft, and a second output gear rotatably coupled to said second counter shaft and said second output shaft and configured to deliver rotational torque from said second counter shaft to said second output shaft.

10. The drive module assembly as set forth in claim 1, wherein said first and second input shafts extend along an input axis, said first and second counter shafts extend along a counter shaft axis, and wherein said first and second output shafts extend along an output axis.

11. The drive module assembly as set forth in claim 10, wherein said input axis, said counter shaft axis, and said output axis are parallel to one another.

12. The drive module assembly as set forth in claim 10, wherein said input axis, said counter shaft axis, and said output axis are offset from one another.

13. The drive module assembly as set forth in claim 10, wherein said counter shaft axis is disposed between said input axis and said output axis.

14. The drive module assembly as set forth in claim 1, wherein said rotor defines a rotor interior, and wherein said differential is disposed in said rotor interior.

15. The drive module assembly as set forth in claim 14, wherein said first and second input shafts are disposed in said rotor interior.

16. The drive module assembly as set forth in claim 1, wherein said first and second input shafts have a peak speed of greater than 20,000 RPM.

17. A vehicle comprising two of said drive module assemblies as set forth in claim 1.

18. A vehicle comprising said drive module assembly as set forth in claim 1, wherein said vehicle comprises an internal combustion engine.

19. A vehicle comprising said drive module assembly as set forth in claim 1, wherein said vehicle is free of an internal combustion engine.

20. The drive module assembly as set forth in claim 1, wherein said first input shaft has a first input shaft length, wherein said second input shaft has a second input shaft length, and wherein said first input shaft length and said second input shaft length are the same.

* * * * *